(12) United States Patent
Raether et al.

(10) Patent No.: US 9,503,528 B2
(45) Date of Patent: Nov. 22, 2016

(54) SYSTEM FOR PROVISIONING SERVICE DATA UTILIZING THE IMS DEFINED SH INTERFACE'S TRANSPARENT DATA

(75) Inventors: Helmut L. Raether, Shorewood, IL (US); Michael Joseph Rudolph, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1850 days.

(21) Appl. No.: 10/867,942

(22) Filed: Jun. 14, 2004

(65) Prior Publication Data
US 2005/0278447 A1    Dec. 15, 2005

(51) Int. Cl.
*G06F 15/16* (2006.01)
*H04L 29/08* (2006.01)
*H04W 80/00* (2009.01)

(52) U.S. Cl.
CPC .............. *H04L 67/16* (2013.01); *H04L 67/12* (2013.01); *H04L 67/24* (2013.01); *H04L 69/329* (2013.01); *H04W 80/00* (2013.01)

(58) Field of Classification Search
USPC ........ 709/227, 217–219, 230–231, 236, 246, 709/200; 455/433, 414.1–414.4; 370/389, 370/395.5, 464–467
See application file for complete search history.

(56) References Cited

U.S. PATENT DOCUMENTS

| | | | |
|---|---|---|---|
| 6,888,828 B1 * | 5/2005 | Partanen et al. | 370/389 |
| 6,954,654 B2 * | 10/2005 | Ejzak | 455/560 |
| 7,340,507 B2 * | 3/2008 | Tuunanen et al. | 709/219 |
| 7,574,203 B2 * | 8/2009 | Laumen et al. | 455/412.1 |
| 7,583,646 B2 * | 9/2009 | Hua | H04W 8/12 370/338 |
| 2002/0013827 A1 * | 1/2002 | Edstrom et al. | 709/219 |
| 2002/0147845 A1 * | 10/2002 | Sanchez-Herrero et al. | 709/245 |
| 2003/0187992 A1 * | 10/2003 | Steenfeldt et al. | 709/227 |
| 2003/0233457 A1 * | 12/2003 | Basilier et al. | 709/227 |
| 2004/0028031 A1 * | 2/2004 | Valin et al. | 370/352 |
| 2004/0137900 A1 * | 7/2004 | Varonen | H04W 4/02 455/433 |
| 2004/0193700 A1 * | 9/2004 | Westman et al. | 709/219 |
| 2005/0226174 A1 * | 10/2005 | Kiss | 370/282 |
| 2005/0265304 A1 * | 12/2005 | Kim et al. | 370/349 |
| 2006/0015617 A1 * | 1/2006 | Castro et al. | 709/226 |
| 2006/0195565 A1 * | 8/2006 | De-Poorter | H04L 29/12009 709/224 |
| 2007/0209061 A1 * | 9/2007 | Dekeyzer | H04L 29/12009 726/3 |
| 2007/0220005 A1 * | 9/2007 | Castro Castro | H04W 4/08 |

OTHER PUBLICATIONS

ETSI 3GPP Specifications 23.228 V5.12.0 Release 5, IP Multimedia Systems Stage 2, published Mar. 2004.*
ETSI 3GPP Specifications 29.328 V5.7 Release 5, Sh Interface signalling flows, published Mar. 2004.*
3GPP2 X.P0013.6 Version 0.1.0, Cx Interface Based on the Diameter Protocol; Protocol Details, published May 2003.*

(Continued)

*Primary Examiner* — Greg C Bengzon
(74) *Attorney, Agent, or Firm* — Patti & Malvone Law Group, LLC

(57) ABSTRACT

Embodiments of the method and apparatus utilizes a conventional provisioning interface to the IMS HSS and the Sh interface from the HSS to a generic application to provision service data on the application at the other end of the Sh interface. One embodiment may have the steps of: interfacing a provisioning system with an HSS with a Sh interface; and using the Sh interface as a provisioning interface.

10 Claims, 10 Drawing Sheets

(56) References Cited

OTHER PUBLICATIONS

Lynell E. Cannell et al.; Service Control for Next-Generation Applications in Wireless IP Multimedia Networks; Wiley InterScience: Journal Issues-Bell Labs Technical Journal. Jul. 9, 2003; pp. 27-42; vol. 8, No. 1; Wiley Periodicals, Inc.; Murrey Hill, NJ, U.S.

3rd Generation Partnership Project, Technical Specification Group Services and Systems Aspects, 3GPP TS 23.002, Network Architecture Release 6, Dec. 2005, p. 50, V6.10.0, F-06921 Sophia Antipolis Cedex, France.

* cited by examiner

Table 1 Data accessible via Sh interface by operation

| XML tag | Access key | Sh-Pull (User-Data-request) | Sh-Subs-Notif (Subscribe-Notifications-Request) | Sh-Update (Profile-Update-Request) |
|---|---|---|---|---|
| PublicIdentifiers | User-Identity + Data-Reference | Y | N | N |
| IMSUserState | | Y | Y | N |
| S-CSCFName | | Y | Y | N |
| RepositoryData | User-Identity + Data-Reference + Service-Indication | Y | Y | Y |
| InitialFilterCriteria | User-Identity + Data-Reference + Server-Name | Y | Y | N |
| LocationInformation | User-Identity + Data-Reference+ Requested-Domain | Y | N | N |
| UserState | | Y | N | N |
| Charging information | | Y | N | N |

FIG. 2

SYSTEM FOR PROVISIONING SERVICE DATA UTILIZING THE IMS DEFINED SH INTERFACE'S TRANSPARENT DATA

TECHNICAL FIELD

The present invention relates generally to provisioning subscriber data, and, more particularly, to a system that utilizes a conventional provisioning interface to the IMS HSS and the Sh interface from the HSS to a generic application to provision service data on the application at the other end of the Sh interface.

BACKGROUND OF THE INVENTION

Service provisioning means many different things to many different people. For example, it may refer to the "preparation beforehand" of IT systems materials or supplies required to carry out some defined activity. It goes further than the initial contingency of providing resources, to the onward management lifecycle of these resources as managed items. This could include the provisioning of purely digital services like user accounts and access privileges on systems, networks and applications. It could also include the provisioning of non-digital or physical resources like the requesting of office space, cell phones and credit cards.

CORBA is one example of an interface that may be used in provisioning systems. CORBA is the acronym for Common Object Request Broker Architecture, OMG's open, vendor-independent architecture and infrastructure that computer applications use to work together over networks. Using the standard protocol IIOP, a CORBA-based program from any vendor, on almost any computer, operating system, programming language, and network, can interoperate with a CORBA-based program from the same or another vendor, on almost any other computer, operating system, programming language, and network.

CORBA is useful in many situations. Because of the easy way that CORBA integrates machines from so many vendors, with sizes ranging from mainframes through minis and desktops to hand-helds and embedded systems, it is the middleware of choice for large (and even not-so-large) enterprises. One of its most important, as well most frequent, uses is in servers that must handle large number of clients, at high hit rates, with high reliability.

CORBA applications are composed of objects, individual units of running software that combine functionality and data, and that frequently (but not always) represent something in the real world. Typically, there are many instances of an object of a single type—for example, an e-commerce website would have many shopping cart object instances, all identical in functionality but differing in that each is assigned to a different customer, and contains data representing the merchandise that its particular customer has selected. For other types, there may be only one instance. When a legacy application, such as an accounting system, is wrapped in code with CORBA interfaces and opened up to clients on the network, there is usually only one instance.

For each object type, such as the shopping cart that we just mentioned, you define an interface in OMG IDL. The interface is the syntax part of the contract that the server object offers to the clients that invoke it. Any client that wants to invoke an operation on the object must use this IDL interface to specify the operation it wants to perform, and to marshal the arguments that it sends. When the invocation reaches the target object, the same interface definition is used there to unmarshal the arguments so that the object can perform the requested operation with them. The interface definition is then used to marshal the results for their trip back, and to unmarshal them when they reach their destination.

The IDL interface definition is independent of programming language, but maps to all of the popular programming languages via OMG standards: OMG has standardized mappings from IDL to C, C++, Java, COBOL, Smalltalk, Ada, Lisp, Python, and IDLscript.

This separation of interface from implementation, enabled by OMG IDL, is the essence of CORBA—how it enables interoperability, with all of the transparencies we've claimed. The interface to each object is defined very strictly. In contrast, the implementation of an object—its running code, and its data—is hidden from the rest of the system (that is, encapsulated) behind a boundary that the client may not cross. Clients access objects only through their advertised interface, invoking only those operations that that the object exposes through its IDL interface, with only those parameters (input and output) that are included in the invocation.

What is known as the Diameter protocol is an extension to the Remote Access Dial In User Services (RADIUS) protocol. It addresses additional capabilities inherent in roaming, Network Access Server AAA, Mobile IP Salability and extensibility. The RADIUS protocol has been widely and successfully deployed to provide authentication, authorization, and accounting (AAA) services for dial-up PPP/IP and Mobile IP access. However, inherent shortcomings of the RADIUS protocol have limited its ability to adapt to the ever-increasing capabilities of routers and network access servers (NAS), and the ever-expanding set of desired AAA services.

The Sh 3GPP reference point provides the definition of the interactions between the HSS (Home Subscriber Server) and the SIP AS (Application Server) and between the HSS and the OSA SCS (Service Capability Server). It is defined using extensibility of the Diameter protocol.

Sh is implemented as an application using the extensibility inherent in the Diameter protocol. Technically, Sh is defined using an IETF vendor specific Diameter application, where the vendor is 3GPP. The vendor identifier is assigned by IANA to 3GPP and the Diameter application identifier has been assigned to the Sh interface.

It is a drawback of prior art provisioning systems that service providers interface to each application individually. As a result separate paths must be set up between the provisioning center and each network element requiring subscriber specific data.

SUMMARY

The invention in one implementation encompasses a method for provisioning application server data using an HSS as a path from a provisioning system to an application server, the method may have the steps of: interfacing a provisioning system with an HSS with a Sh interface; and using the Sh interface as a provisioning interface.

BRIEF DESCRIPTION OF THE DRAWINGS

Features of exemplary implementations of the invention will become apparent from the description, the claims, and the accompanying drawings in which:

FIG. 2 illustrates a table of data accessible via the Sh interface by operation.

DETAILED DESCRIPTION

Figure 1:
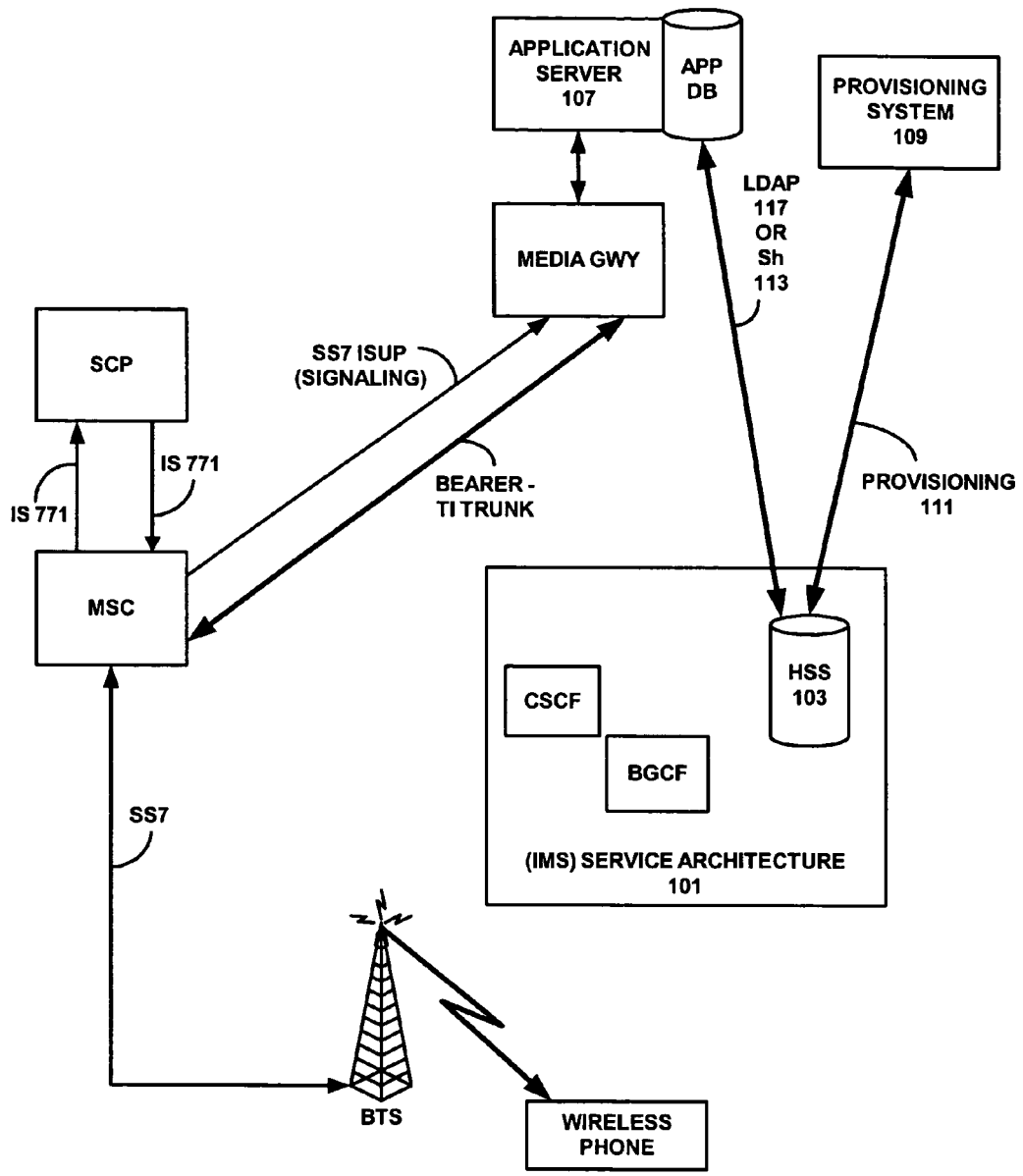
FIG. 1 depicts a block diagram illustrative of a telecommunication system for use with the present method and system.

The particular values and configurations discussed in these non-limiting examples can be varied and are cited merely to illustrate an embodiment of the present invention and are not intended to limit the scope of the invention.

Embodiments of the present apparatus and method provide for a system that utilizes a conventional provisioning interface to the IMS HSS and the Sh interface from the HSS to a generic application to provision service data on the application at the other end of the Sh interface.

Embodiments of the present method and system provide for generically provisioning subscriber data associated with any IMS application server. These results in the advantage that the service provider's provisioning system can reduce the number of interfaces it must support. Embodiments of this system utilize a conventional provisioning interface to the IMS HSS and the Sh interface from the HSS to a generic application to provision service data on the application at the other end of the Sh interface. This is useful because the HSS uses transparent data, so it does not need to recognize the format of what it is passing. Furthermore, as one example, provisioning of elements onto the HSS already exists via a well-defined CORBA interface. The provisioning system may use defined standard mechanisms to create a provisioning path to the application server. It is to be understood that a CORBA interface is only one example that may utilize the embodiments of the present system and method.

The Sh interface is one example of a publish/subscribe interface. A publish/subscribe interface allows an application (client) to store data remotely on a server. It also allows the client to subscribe to subsequent updates of the data. When the data is updated, the server sends a copy of the data to the client. In the present implementation the application server acts as the client, and the HSS acts as the server. The IP Multimedia subsystem (IMS) Sh interface is considered a publish/subscribe interface.

The 3GPP Technical Specification specifies the interactions between the HSS (Home Subscriber Server) and the SIP AS and between the HSS and the OSA SCS (Service Capability Server). This interface is referred to as the Sh reference point. The IP Multimedia Core Network Subsystem stage 2 is specified in 3GPP TS 23.228 and the signaling flows for the IP multimedia call control based on SIP and SDP are specified in 3GPP TS 24.228. The IP Multimedia Session Handling with the IP Multimedia call model is specified in 3GPP TS 23.218.

In the IP Multimedia session the IP Multimedia session and IP Multimedia call may be treated as equivalent. Transparent data is data that may be understood syntactically but not semantically by the HSS. It is data that an AS may store in the HSS to support its service logic. One example is data that an AS stores in the HSS, using it as a repository. Non-transparent data may be data that is understood both syntactically and semantically by the HSS. An AS (application server) may denote either of a SIP application server or an OSA Service Capability Server.

The application server may communicate with the HSS over the Sh interface, and The HSS may communicate with the application server over the Sh interface. Operations on the Sh interface may be classified in functional groups, such as, data handling procedures (downloading of data from the HSS to an AS, and updating of data in the HSS), and subscription/notification procedures (such as, an AS subscribing to receive notifications from the HSS of changes in data, and the HSS notifying an AS of changes in data for which the AS previously had subscribed).

An application server (AS) may be an IP/PBX, a Buddy System, a Push-to-Talk system, Instant Messaging, any general prepaid telephone service, etc.

Figure 10A:
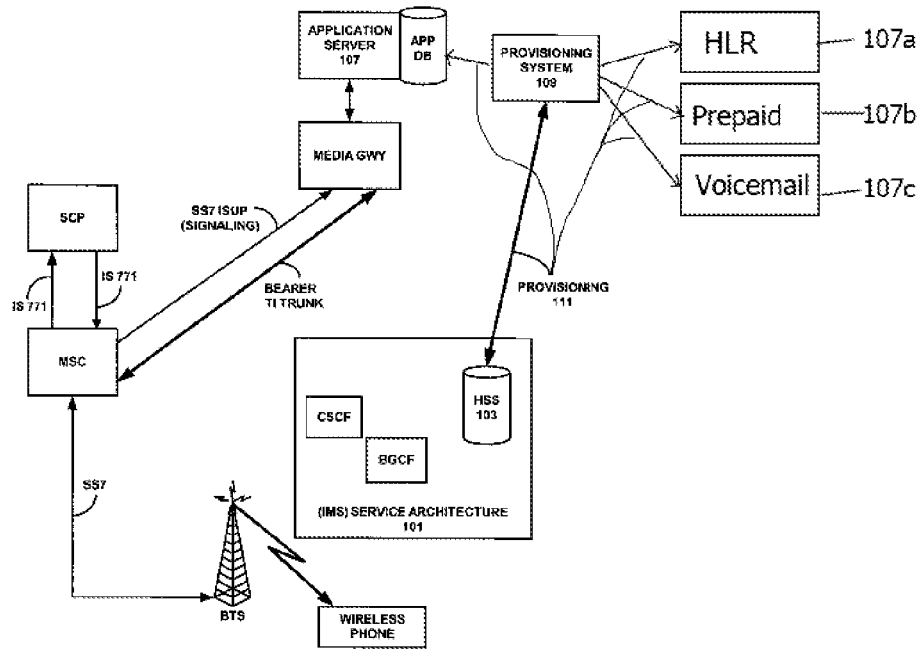
FIG. 10A depicts a block diagram illustrative of a prior art telecommunication system for use with the present method and system.

Referring to FIG. 10A, the provisioning method and system of a prior art IMS system is shown. Provisioning system 109 (also referred to as a Provisioning Object Manager POM) sends provisioning information to HSS 103 for its subsequent use. Provisioning system 109 also separately sends provisioning information to application servers 107a-c separately.

Figure 10B:
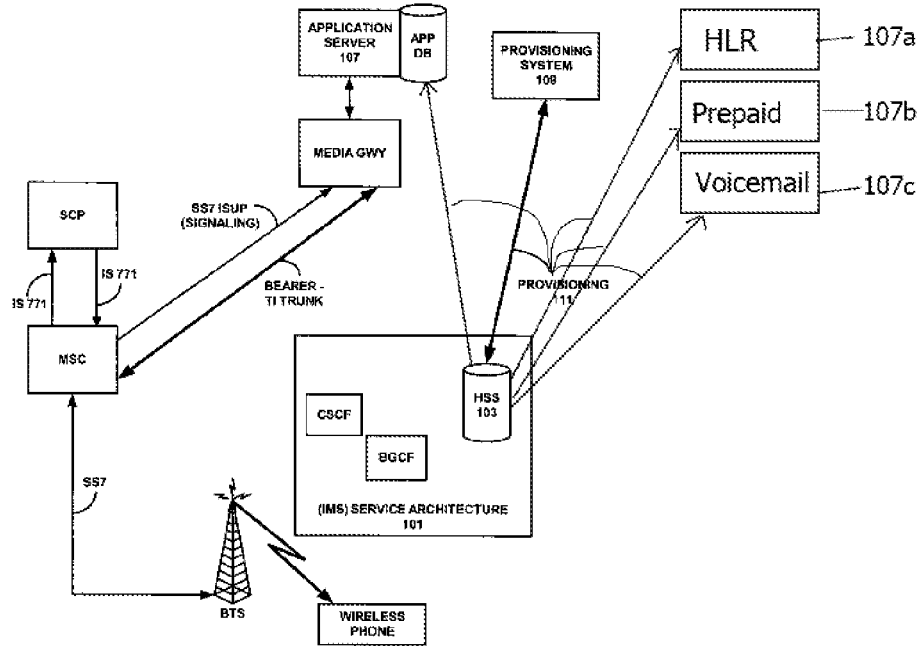
FIG. 10B depicts a block diagram illustrative of a telecommunication system having a plurality of application servers.

In FIG. 10B, an embodiment of the present invention is shown wherein provisioning system 109 sends provisioning data only to HSS 103 using a standard interface. Then, HSS 103 distributes the provisioning data to one or more application servers 107a-c using the Sh interface.

Referring to FIG. 1, the IMS 101 provides an infrastructure to handle multiple concurrent IP based services for a subscriber, within a mobility framework. One piece of this IMS 101 is the HSS 103. The HSS 103 is the central repository of subscriber data used during an IMS call. Subscriber data is communicated to the I-CSCF, and S-CSCF as part of user registration over the Cx diameter-based interface. Other applications are able to access much of this data over another HSS interface, named Sh by 3GPP.

The HSS 103 plays an important role in the IMS 101, ensuring that the profile for an IMS subscriber gets passed to the S-CSCF after authentication. It contains the data necessary for the CSCF to control and/or redirect the SIP call. This is accomplished on the Cx interface.

Another role the HSS 103 plays is that of a central data repository to facilitate information exchange among the application servers (AS). It allows applications to pull, subscribe, or push data, depending on the type of data. Services may now communicate among multiple processing platforms by leaving repository data in the HSS 103. Also, other types of HSS data are available to the applications on a request or subscription basis. Some restrictions on type of data are indicated in a revised version of a 3GPP 29.328 (see table depicted in FIG. 2).

The Sh interface allows data communication between the HSS and the application server(s) for a subscriber. It is composed of non-transparent data and transparent data. Non-transparent data is associated with a subscriber and includes the tags in the FIG. 2 table, except row 4.

Repository Data or transparent data is associated per subscriber, but also per service-indication. With different service-indications, one service may share multiple definitions of transparent data, or the transparent data can be shared among separate platforms deploying Service1, while another set of transparent data can be shared among platforms deploying Service2. Transparent data format is not known to the HSS, but could be encapsulated XML or LDAP queries. It can be written, or read with the Sh Diameter interface (also referred to as the Sh interface). Additionally, a subscribe and notify capability is supported by the interface.

Much of the HSS data can be read, or pulled. Furthermore, selected elements of this data may also be subscribed by an application server (AS). In this way the HSS sends data to the AS when it changes at the HSS.

Figure 3:
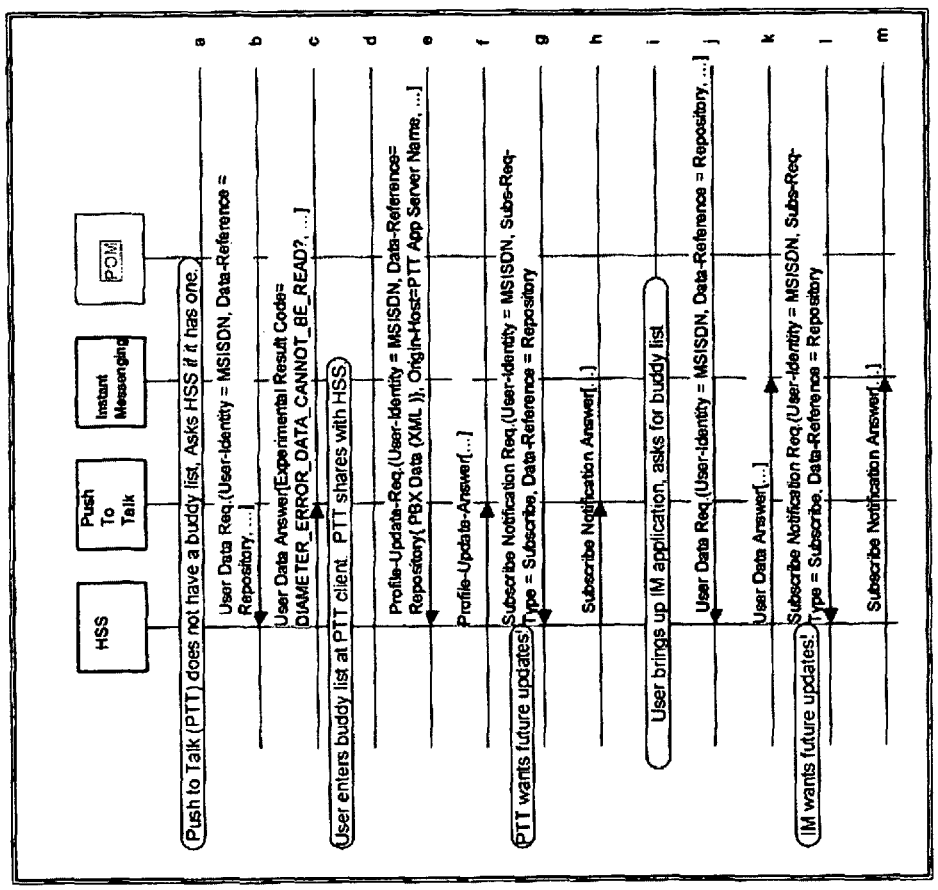
FIG. 3 illustrates a very general flow chart of logical operational steps that may be followed in accordance with one embodiment of the present method and system.
Figure 4:
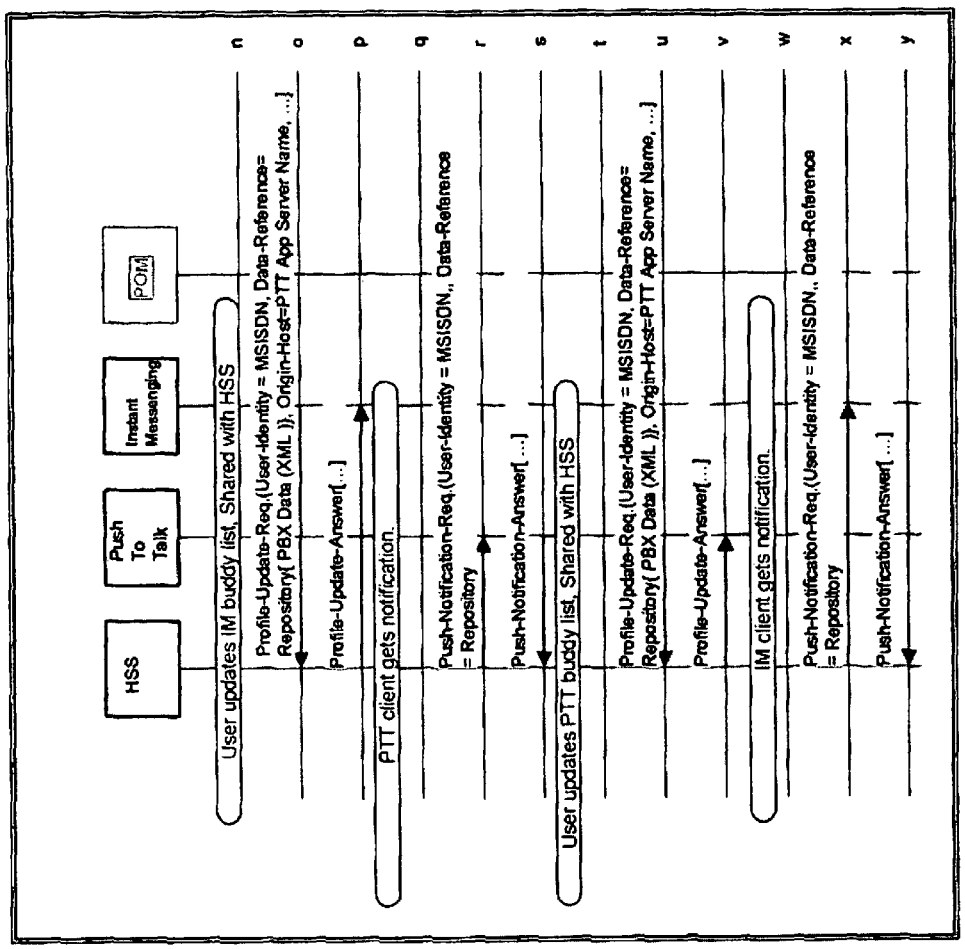
FIG. 4 illustrates another flow chart of logical operational steps that may be followed in accordance with one embodiment of the present method and system.

An example of transparent data is a buddy list that may be shared among willing application partners. For example, assume that service A (Push To Talk (PTT)) and Service B (Instant Messaging) want to share buddy lists. The sequence of Sh interactions illustrated in FIGS. 3 and 4 may be used to accomplish this sharing, using the HSS as the common repository.

For the Sh transparent data to convey across applications, each application must be able to understand the agreed upon structure stored at the HSS. In this scenario, both are capable of writing the data as well as receiving and parsing notifications that the data changed.

Regarding the role of the provisioning system in the MMD service architecture platform, the provisioning system is viewed as a provisioning interface for all the network elements required enabling all subscribers to gain access to each of their services. A CORBA interface to the HSS is used to provision the HSS subscribers in support of their IMS capabilities. Additionally, it is perceived that the HSS will also pass application server provisioning information from the provisioning system toward multiple variants of application server systems. Transparent data may be used to accomplish provisioning the Sh interface.

It is of interest in the application server situation, as the contents of the repository data are (in a true IMS space,) unknown to the HSS. Therefore, the HSS would eloquently pass the transparent data, and not need to be involved should the data definition change, or be expanded. Only the end-user (application servers) needs to understand its format.

Figure 5:
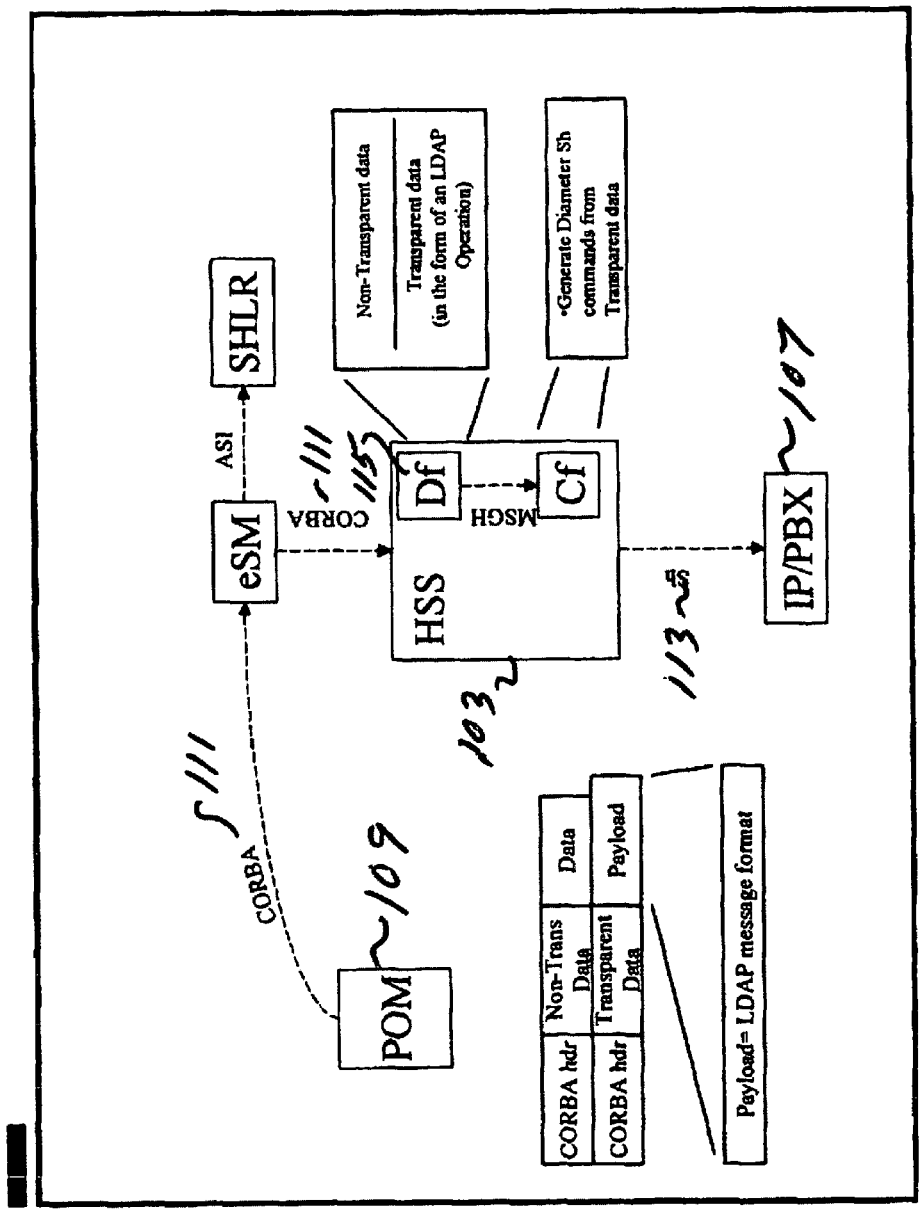
FIG. 5 depicts a block diagram of one embodiment of the present method and system.

FIG. 5 depicts one embodiment of the HSS 103 interface to the provisioning system 109 and application server 107, such as an IP/PBX. Our goal is to provision the application server data using the HSS 103 as a path from the provisioning system 109. Two steps are required. First the data is sent from the provisioning system 109 to the HSS 103, then from HSS 103 to application server 109. To attain this CORBA provisioning 111 from the provisioning system 109 to the HSS 103, and then use the transparent data capabilities of the Sh interface 113 to notify the application server 107 of new provisioned data for a subscriber.

The provisioning system 109 provisions the HSS subscriber data using the CORBA interface 111. All the data required to support the Cx interface, as well as non-writable data on the Sh interface 113 comes via this mechanism. The Sh data defined as transparent data may also be transmitted over this CORBA interface 111. The non-transparent data for a subscriber is received at the HSS 103 and stored with its known attributes. Transparent data for this application server service is stored as a data block in the DF function 115 of the HSS 103. The HSS 103 does not know the contents of the transparent data. This mechanism conveys HSS data and subscriber data related to application servers 107 from the provisioning system 109 into the HSS 103.

To accomplish the next step, the HSS provisioning over this CORBA interface 111 may include new parameters to include subscription-request-type, AS identity, and Service-Indication of the application server 107. This content would be similar to receiving a Sh-Subs-Notif (Subscribe-Notifications-Request) from the application server. It may also include authentication or other information required to set up the subsequent Diameter message. The transparent data parameter could be encoded as CORBA encapsulated LDAP queries in a format the application server 107 understands. This would provide the HSS 103 sufficient data to proceed.

The next step is to get application server data from the HSS 103 to the application server 107. Transparent data with a single service-indication will provision a single service. Furthermore, multiple service-indications may be used to provision multiple services for the same subscriber. The HSS 103, takes parameters received via CORBA provisioning, subscribes the application server 107 to the transparent data, then passes the data containing LDAP provisioning to the application server 107 via a Diameter protocol Sh-Notif (Push-Notification-Request) procedure (Sh interface 113). The application server 107 will support the Sh Diameter interface, extract the LDAP envelope from the transparent data AVP, and apply the changes. The transparent data payload contained under the CORBA wrapper and Sh interface is now communicated between endpoints understanding the predefined contents. The LDAP envelope in one example comprises a native provisioning script.

Figure 6:
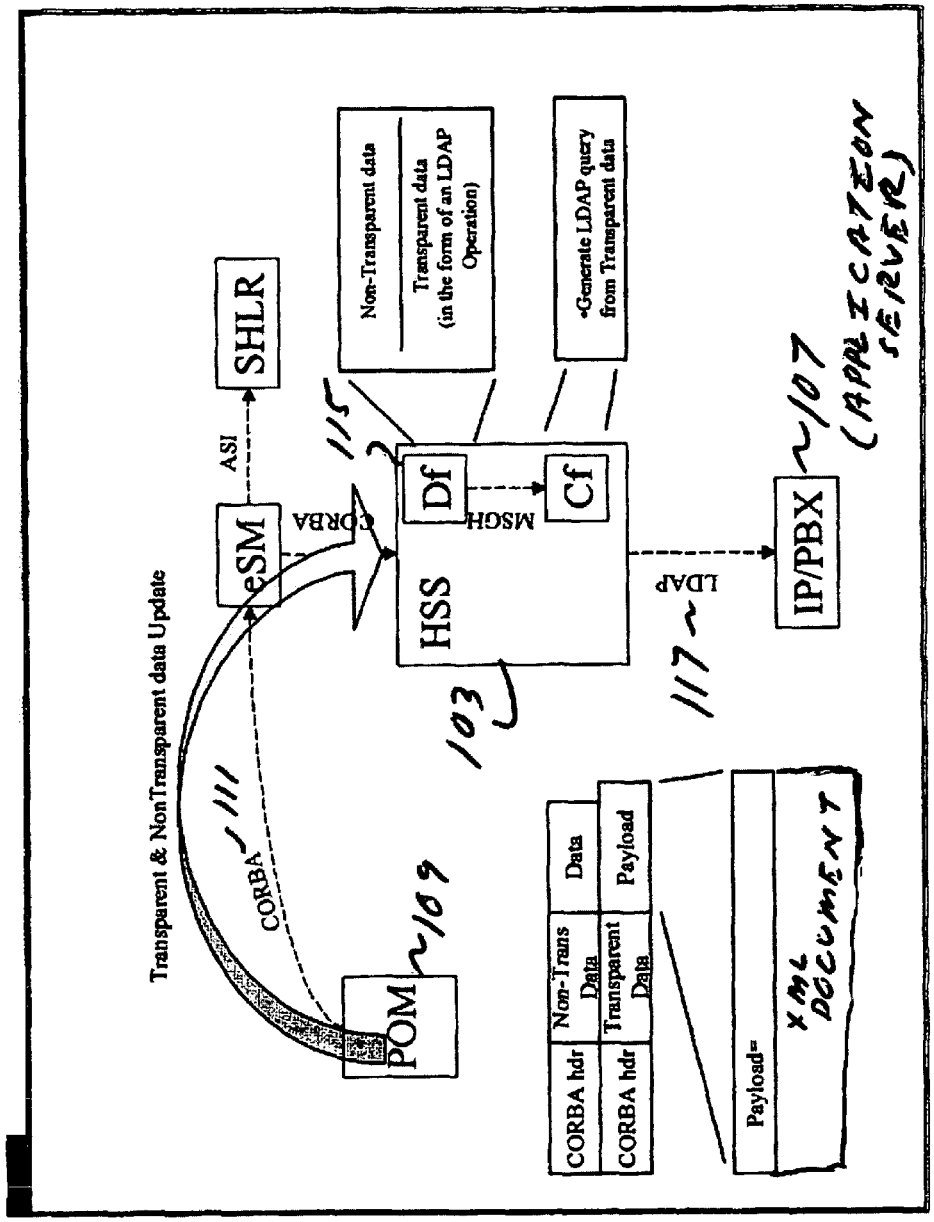
FIG. 6 depicts a block diagram of another embodiment of the present method and system.

FIG. 6 depicts another embodiment of the HSS interface from the HSS 103 to the provisioning system 109 and application server 107. In this embodiment the current interface to the application server provisioning occurs via an LDAP protocol, and that an Sh interface is not available at the application server 107. The application server data may be provisioned using the HSS 103 as a path from the provisioning system 109. Again, two steps are required. First the data is sent from the provisioning system 109 to the HSS 103, then from HSS 103 to application server 107. To attain the same CORBA provisioning is utilized from the provisioning system 109 to the HSS 103 as described above. Next an LDAP interface may be created from the HSS 103 to the desired application server 107, and include the encapsulated LDAP queries found in the transparent data AVP.

Data supporting the LDAP bind request may be included in the provisioning system CORBA provisioning. This would indicate to the HSS 103 that an LDAP interface 117 is required to transmit transparent data to the application server 107. Since this transparent data is encapsulated LDAP strings, the HSS 103 may move this transparent data over the LDAP 117 interface to the application server 107. This approach does not require changes at the provisioning system 109, but only requires that the HSS 103 know this special mode of transmission exists so that it can differentiate LDAP or Diameter protocol requirements.

One embodiment of the present method and system includes encapsulating LDAP within Corba objects, and subsequently propagating the data to the HSS. Nonetheless, several variants of this embodiment are possible as discussed in the following sections.

In order to reduce the amount of data stored at the HSS a CORBA interface is created that acts as if an application server provided the following sequence:

Subscribe the application server to transparent data for this service;

Create new repository data in the HSS emulating the Sh Profile-Update-request with a sequence Number of 0 to indicate data creation;

This will cause the application server to be notified of this data change;

Unsubscribe the application server to the transparent data for this service; and Delete the transparent data for this service/subscriber combination using Update-Profile-Request procedure containing no service data. The data may now be removed from the HSS consistent with the Sh interface descriptions.

This approach may be followed for the FIG. 5 LDAP solution as well. Provisioned transparent data would remain the same as in the FIG. 4 embodiment. The Diameter AVP's may retain the same naming and provisioning. After data is transmitted to the application server, the HSS could proceed to delete the stored transparent data.

The provisioning system format for application server data is mostly unknown. CORBA with encapsulated LDAP queries is one embodiment. If this format is not LDAP encapsulated CORBA, or some other data form that can be encapsulated within transparent data, then another suggestion is XML formatted relational database items that could each be associated with a separate Add, modify, or delete operation sent to the AS.

If the HSS must understand the details of each application server or application server provisioning schema, then significant work is required at the HSS to support each AS's requirements. Applications, including application servers, have complex data schemas. To mitigate the risk of an option requiring the HSS to interpret data, a mapping from XML to LDIF, coupled with a more defined LDIF to LDAP interface may be an appropriate approach. Clearly a set of interface translation rules would be better than requiring the HSS to know the schema of each application server or AS provisioning parameters. XML to LDIF and LDIF to LDAP translations are known.

Figure 7:
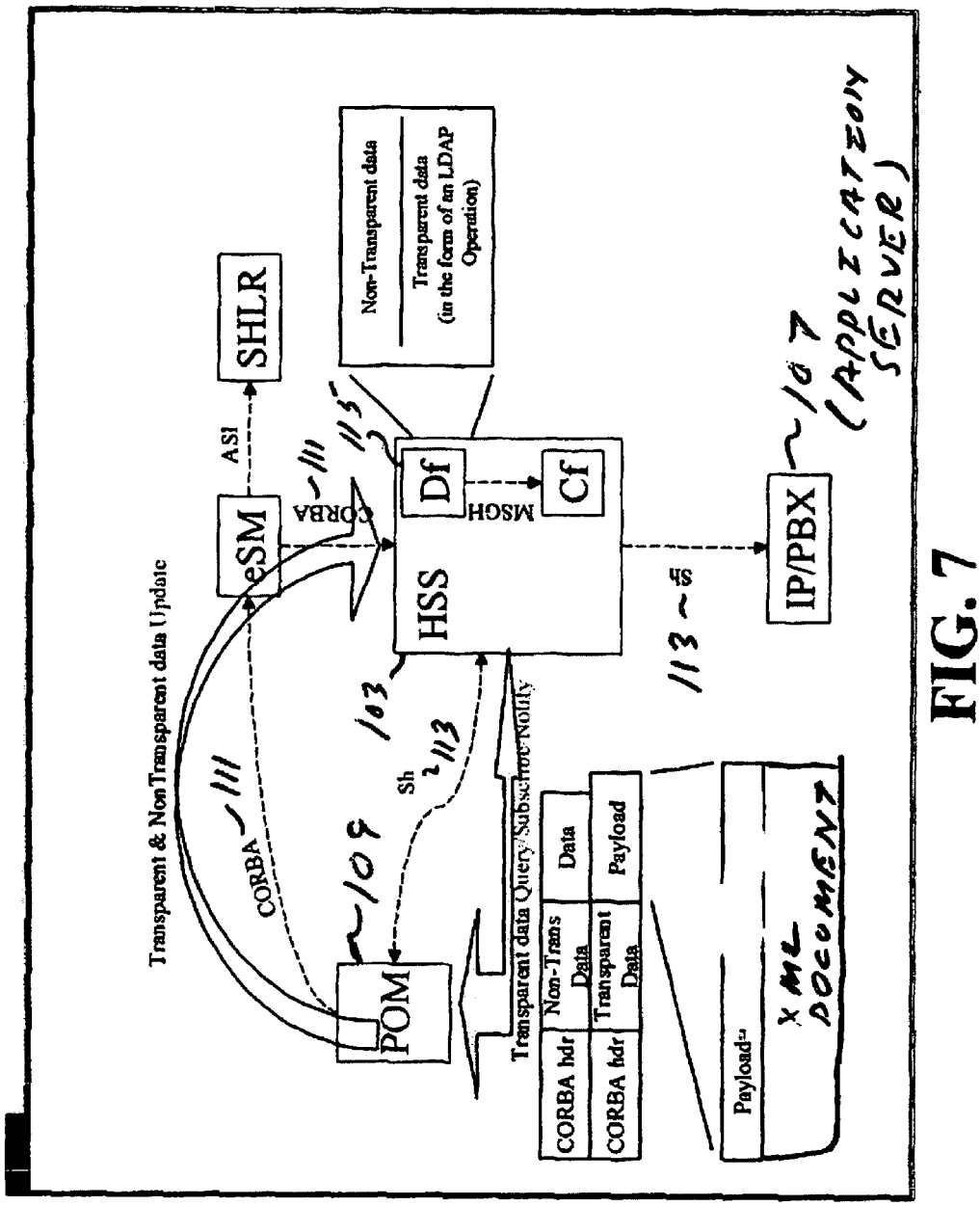
FIG. 7 depicts a block diagram of a further embodiment of the present method and system.

The provisioning system may also implement a diameter Sh interface to the HSS, act as an application server, and send a Subscribe-Notifications-Request to request real-time updates of this data in the event the application server changes it. Additionally, more real-time HSS data is available over this HSS interface. This capability is indicated by the Query/Subscribe/Notify arrow from the provisioning system to the HSS in FIGS. 6 and 7.

In general, embodiments of the present system may have the following: means for sending data from the provisioning system to the HSS, and then sending data from the HSS to the application server; means for provisioning, by the provisioning system, HSS subscriber data using a predetermined interface; means for receiving non-transparent data for a subscriber at the HSS and storing the non-transparent data with known attributes thereof at the HSS; means for storing transparent data for this application server service as a data block in the HSS; means for providing, for the HSS provisioning over the predetermined interface, new parameters indicative of at least an identity of the application server; means for subscribing, by the HSS using the parameters received via the predetermined interface, the application server to the transparent data; means for passing the transparent data to the application server via a predetermined protocol; means for extracting, by the application server to support the publish/subscribe interface, information from the transparent data; and means for communicating a transparent data payload of the transparent data, contained under a predetermined wrapper for the predetermined interface and the publish/subscribe interface, between endpoints that understand the predefined contents.

Figure 8:
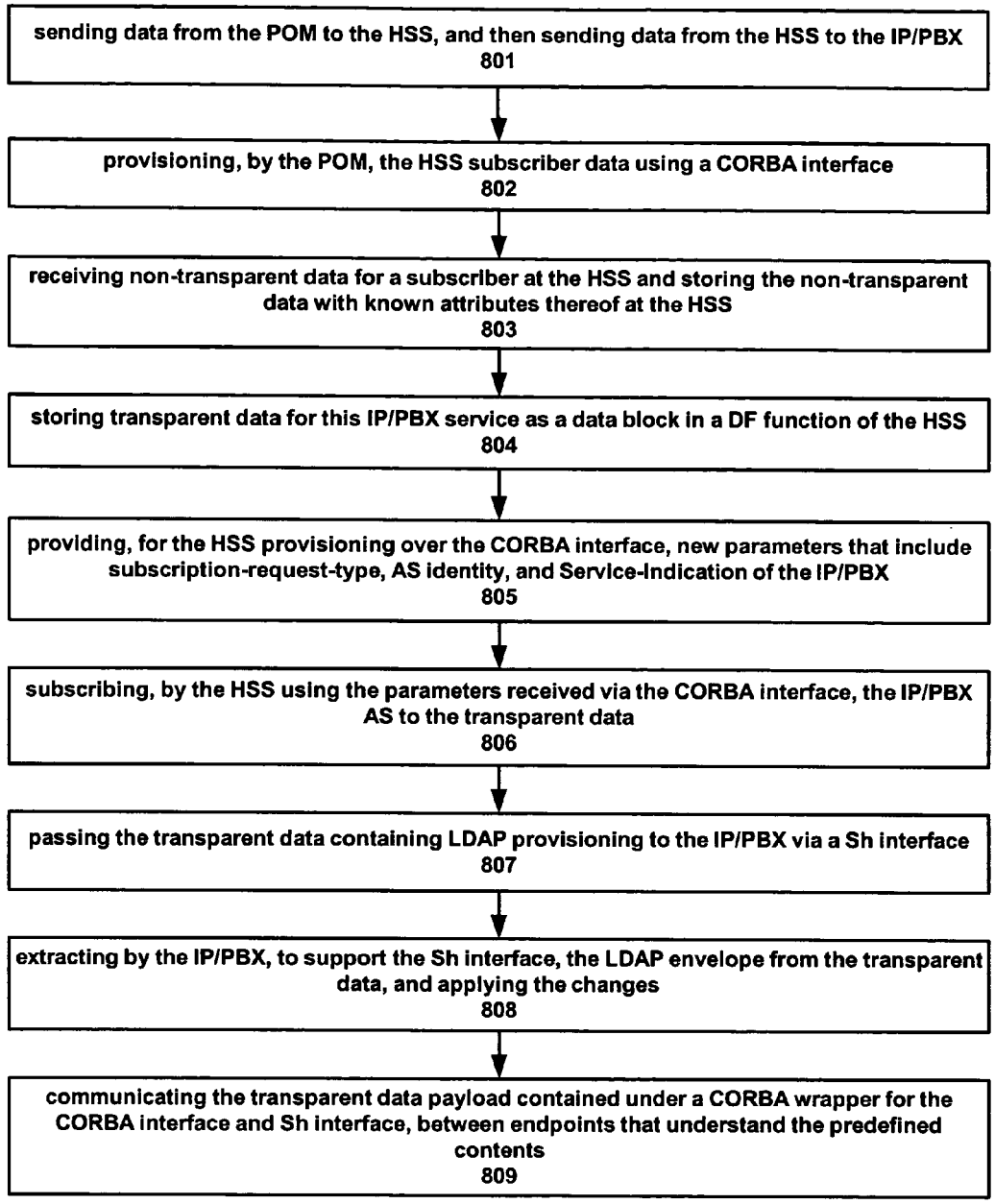
FIG. 8 illustrates a flow chart of logical operational steps that may be followed in accordance with one embodiment of the present method and system.

One embodiment of the present method, as depicted in FIG. 8, for provisioning application server data using an HSS as a path from a provisioning system to an application server may have the steps of: sending data from the provisioning system to the HSS, and then sending data from the HSS to the application server (step 801); provisioning, by the provisioning system, the HSS subscriber data using a CORBA interface (step 802); receiving non-transparent data for a subscriber at the HSS and storing the non-transparent data with known attributes thereof at the HSS (step 803); storing transparent data for this application server service as a data block in a DF function of the HSS (step 804); providing, for the HSS provisioning over the CORBA interface, new parameters that include subscription-request-type, AS identity, and Service-Indication of the application server (step 805); subscribing, by the HSS using the parameters received via the CORBA interface, the application server AS to the transparent data (step 806); passing the transparent data containing LDAP provisioning to the application server via a Sh interface (step 807); extracting by the application server, to support the Sh interface, the LDAP envelope from the transparent data, and applying the changes (step 808); and communicating the transparent data payload contained under a CORBA wrapper for the CORBA interface and Sh interface, between endpoints that understand the predefined contents (step 809).

Figure 9:
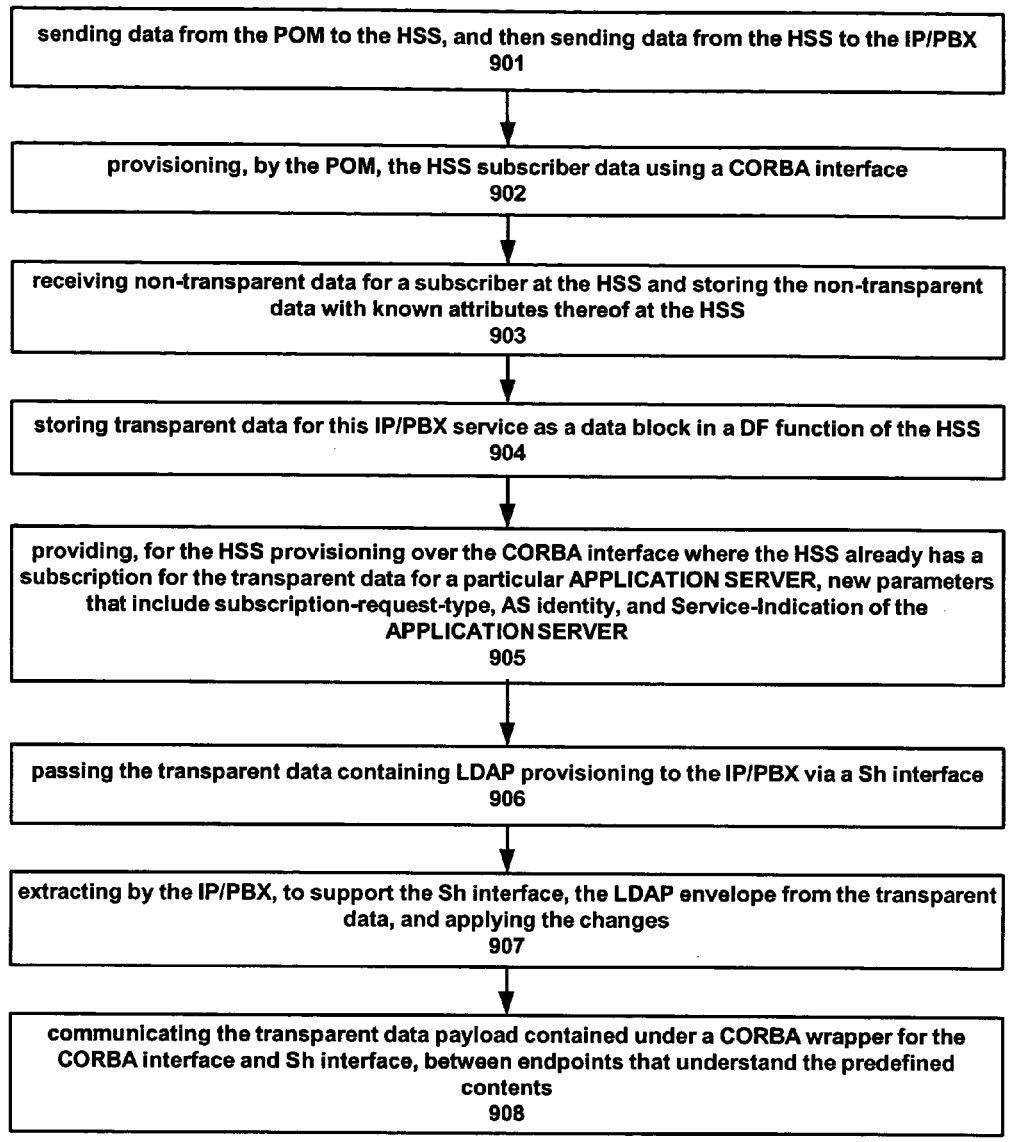
FIG. 9 illustrates another flow chart of logical operational steps that may be followed in accordance with one embodiment of the present method and system.

Another embodiment of the present method, as depicted in FIG. 9, for provisioning application server data using an HSS as a path from a provisioning system to an application server may have the steps of: sending data from the provisioning system to the HSS, and then sending data from the HSS to the application server (step 901); provisioning, by the provisioning system, the HSS subscriber data using a CORBA interface (step 902); receiving non-transparent data for a subscriber at the HSS and storing the non-transparent data with known attributes thereof at the HSS (step 903); storing transparent data for this application server service as a data block in a DF function of the HSS (step 904); providing, for the HSS provisioning over the CORBA interface, new parameters that include subscription-request-type, AS identity, and Service-Indication of the application server (step 905); passing the transparent data containing LDAP provisioning to the application server via a Sh interface (step 906); extracting by the application server, to support the Sh interface, the LDAP envelope from the transparent data, and applying the changes (step 907); and communicating the transparent data payload contained under a CORBA wrapper for the CORBA interface and Sh interface, between endpoints that understand the predefined contents (step 908).

It is another feature of embodiments of the present method and system that the system may also report changes back from an application server to a provisioning system. In one embodiment such a method may have the following steps: interfacing a provisioning system with an HSS with a publish/subscribe interface; using the publish/subscribe interface as a provisioning interface to provision application server data to an application server; and propagating data changes from the application server back to the provisioning system using the publish/subscribe interface. In some embodiments the publish/subscribe interface may be an Sh interface.

The improved present method and system overcomes the drawbacks of the prior art wherein provisioning systems at service providers interface to each application individually, resulting in the necessity of setting up separate paths between the provisioning center and each network element requiring subscriber specific data.

Embodiments of the present method and system eliminate the need for a separate provisioning path to each application server, and instead use the HSS to forward the request, without requiring the HSS to know the contents of the request. This is beneficial at upgrade time, when the contents of the provisioning block are changed, the application and the provisioning system must change, but since the HSS doesn't know the format, it does not need an interface upgrade.

Because the Sh interface allows subscribe/notify of provisioning into transparent data, the Sh interface allows the HSS to find the correct application server, and the provisioning system does not need to know where the data is going other than to the HSS. In one example, there may be a plurality of application servers, each possibly having a plurality of subscribers, and the provisioning system does not know which subscribers are associated with which application servers. When the provisioning data arrives at the provisioning system, the provisioning system only knows which HSS to send it to. The HSS maintains subscription information, therefore knows which subscriber to send the provisioning data because the transparent data has name and counter data, as well as payload data for the particular subscriber.

The present system and method may be used with non-mobile phones and terminals, as well as, mobile phones and mobile terminals. Also, different types of data storage devices may be used with the present method and system. For example, a data storage device may be one or more of a magnetic, electrical, optical, biological, and atomic data storage medium.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method for provisioning application server data from a provisioning system for an IMS network to an IMS application server, the method comprising the steps of:
receiving the application server data, for the IMS application server, at the IMS HSS from the provisioning system over a common provisioning path for a plurality of IMS application servers, wherein the common provisioning path comprises a predetermined interface from the provisioning system to the IMS HSS, wherein the application server data comprises non-transparent data, which is understood syntactically and semantically by the IMS HSS and transparent data, which is understood syntactically but not semantically by the IMS HSS;

storing the non-transparent data with known attributes thereof at the IMS HSS in a non-transitory computer-readable medium;
storing the transparent data as a data block in the non-transitory computer-readable medium of the IMS HSS for service of the one IMS application server;
receiving one or more subscription parameters at the IMS HSS from the provisioning system over the predetermined interface, wherein the one or more subscription parameters are for a subscribe/notify protocol between the IMS HSS and the IMS application server and comprise a subscription request type, a service indication, and an identity of the one IMS application server, wherein the subscribe/notify protocol is a Sh interface;
subscribing, by the IMS HSS using the one or more subscription parameters for the subscribe/notify protocol received from the provisioning system, the one IMS application server to the transparent data of the application server data on the IMS HSS;
pushing the transparent data to the one IMS application server by the IMS HSS via the subscribe/notify protocol;
wherein a single service may be provisioned with transparent data with a single service-indication, multiple services for a same subscriber may be provisioned with transparent data with multiple service-indications.

2. The method of claim 1, further comprising the step of:
extracting, by the one IMS application server to support the subscribe/notify protocol, an envelope from the transparent data, parsing notifications of data changes, and applying the data changes.

3. The method of claim 1, wherein the step of receiving the one or more subscription parameters comprises the step of:
receiving the one or more subscription parameters within the application server data.

4. The method of claim 1, further comprising the steps of:
unsubscribing the one IMS application server from the transparent data, by the IMS HSS, after the transparent data has been pushed to the one IMS application server;
deleting the transparent data from the IMS HSS after the transparent data has been pushed to the one IMS application server.

5. The method of claim 1, wherein the step of subscribing comprises the step of:
subscribing the IMS application server to receive notifications of changes in the transparent data stored in the data block in the IMS HSS.

6. A non-transitory computer-readable storage device storing computer-executable instructions which, when executed by a processor of a computing device, causes the processor to perform a method of provisioning application server data from a provisioning system for an IMS network to an IMS application server, the method comprising the steps of:
receiving the application server data, for the IMS application server, at the IMS HSS from the provisioning system over a common provisioning path for a plurality of IMS application servers, wherein the common provisioning path comprises a predetermined interface from the provisioning system to the IMS HSS, wherein the application server data comprises non-transparent data, which is understood syntactically and semantically by the IMS HSS and transparent data, which is understood syntactically but not semantically by the IMS HSS;

storing the non-transparent data with known attributes thereof at the IMS HSS;

storing the transparent data for this IMS application server service as a data block in the IMS HSS for service of the one IMS application server;

receiving one or more subscription parameters at the IMS HSS from the provisioning system over the predetermined interface, wherein the one or more subscription parameters are for a subscribe/notify protocol between the IMS HSS and the IMS application server and comprise a subscription request type, a service indication, and an identity of the one IMS application server, wherein the subscribe/notify protocol is a Sh interface;

subscribing, by the IMS HSS using the one or more subscription parameters for the subscribe/notify protocol received from the provisioning system, the one IMS application server to the transparent data of the application server data on the IMS HSS;

pushing the transparent data to the one IMS application server by the IMS HSS via the subscribe/notify protocol;

wherein a single service may be provisioned with transparent data with a single service-indication, multiple services for a same subscriber may be provisioned with transparent data with multiple service-indications.

7. The non-transitory computer-readable storage device of claim 6, wherein the subscribing step further comprises:
subscribing the IMS application server to receive notifications of changes in the transparent data stored in the data block in the IMS HSS.

8. The non-transitory computer-readable storage device of claim 6, further comprising the step of:
extracting, by the one IMS application server to support the subscribe/notify protocol, an envelope from the transparent data, parsing notifications of data changes, and applying the data changes.

9. The non-transitory computer-readable storage device of claim 6, wherein the step of receiving the one or more subscription parameters comprises:
receiving the one or more subscription parameters within the application server data.

10. The non-transitory computer-readable storage device of claim 6, further comprising:
unsubscribing the one IMS application server from the transparent data, by the IMS HSS, after the transparent data has been pushed to the one IMS application server; and
deleting the transparent data from the IMS HSS after the transparent data has been pushed to the one IMS application server.

\* \* \* \* \*